United States Patent
Neerman

(10) Patent No.: US 9,452,804 B2
(45) Date of Patent: Sep. 27, 2016

(54) TRICYCLE

(71) Applicant: N.G.M. SPRL, Kortrijk (BE)

(72) Inventor: Johan Neerman, Kortrijk (BE)

(73) Assignee: N.G.M. SPRL, Kortrijk (BE)

( * ) Notice: Subject to any disclaimer, the term of this patent is extended or adjusted under 35 U.S.C. 154(b) by 0 days.

(21) Appl. No.: 14/774,672

(22) PCT Filed: Mar. 10, 2014

(86) PCT No.: PCT/IB2014/059583
§ 371 (c)(1),
(2) Date: Sep. 10, 2015

(87) PCT Pub. No.: WO2014/141036
PCT Pub. Date: Sep. 18, 2014

(65) Prior Publication Data
US 2016/0023707 A1  Jan. 28, 2016

(30) Foreign Application Priority Data

Mar. 11, 2013 (BE) .................................. 2013/0158

(51) Int. Cl.
*B62K 5/10* (2013.01)
*B62J 1/00* (2006.01)
*B62J 1/28* (2006.01)
(Continued)

(52) U.S. Cl.
CPC .................. *B62K 5/10* (2013.01); *B62J 1/005* (2013.01); *B62J 1/007* (2013.01); *B62J 1/28* (2013.01); *B62J 25/00* (2013.01); *B62K 3/002* (2013.01); *B62K 5/06* (2013.01); *B62K 2204/00* (2013.01)

(58) Field of Classification Search
CPC .......... B62K 5/10; B62K 3/002; B62K 5/06; B62K 5/00; B62K 5/02; B62K 5/023; B62K 2005/001; B62K 15/00; B62K 2015/005; B62K 15/006; B62J 1/005; B62J 1/007; B62J 1/28; B62J 25/00; B62J 1/00
See application file for complete search history.

(56) References Cited

U.S. PATENT DOCUMENTS 5,240,267 A * 8/1993 Owsen ..................... B62K 5/10
280/124.103
5,730,453 A * 3/1998 Owsen ..................... B62K 5/10
280/124.103
(Continued)

FOREIGN PATENT DOCUMENTS

EP       1300126 A1    4/2003
EP       2147852 A1    1/2010
(Continued)

OTHER PUBLICATIONS

International Search Report dated Apr. 11, 2014.

*Primary Examiner* — John Walters
*Assistant Examiner* — Brian Swenson

(57) ABSTRACT

A tricycle (1), designed to move a user, that is more ergonomic and easier to operate to carry a person, comprising a front wheel (2), two rear wheels (3), a frame (4) joining the wheels (2, 3), substantially comprising a stationary rear section (4a) relative to the support plane of the three wheels (2, 3) and a front section (4b) being able to pivot laterally, relative to the substantially stationary section (4a), about a tilting axis (19) substantially in the longitudinal direction of the tricycle (1), a footrest (5) located on the pivoting section (4b) and an ischiatic support (6) located on the essentially stationary section (4a).

17 Claims, 6 Drawing Sheets

(51) Int. Cl.
 *B62J 25/00* (2006.01)
 *B62K 3/00* (2006.01)
 *B62K 5/06* (2006.01)

(56) References Cited

U.S. PATENT DOCUMENTS

| | | | | |
|---|---|---|---|---|
| 6,715,779 | B2* | 4/2004 | Eschenbach | B62K 3/002 |
| | | | | 280/221 |
| 8,141,890 | B2* | 3/2012 | Hughes | B60G 21/007 |
| | | | | 180/210 |
| 8,152,191 | B2* | 4/2012 | Huang | B62K 25/286 |
| | | | | 280/275 |
| 8,376,372 | B2* | 2/2013 | Kanou | B62K 5/025 |
| | | | | 180/210 |
| 2007/0096427 | A1* | 5/2007 | Knaub | A61G 5/042 |
| | | | | 280/304.1 |
| 2007/0152422 | A1 | 7/2007 | Lin | |
| 2010/0187873 | A1* | 7/2010 | Geyer | B62J 1/00 |
| | | | | 297/215.13 |

FOREIGN PATENT DOCUMENTS

| | | |
|---|---|---|
| FR | 2821050 A1 | 8/2002 |
| WO | 2011121211 A1 | 10/2011 |

\* cited by examiner

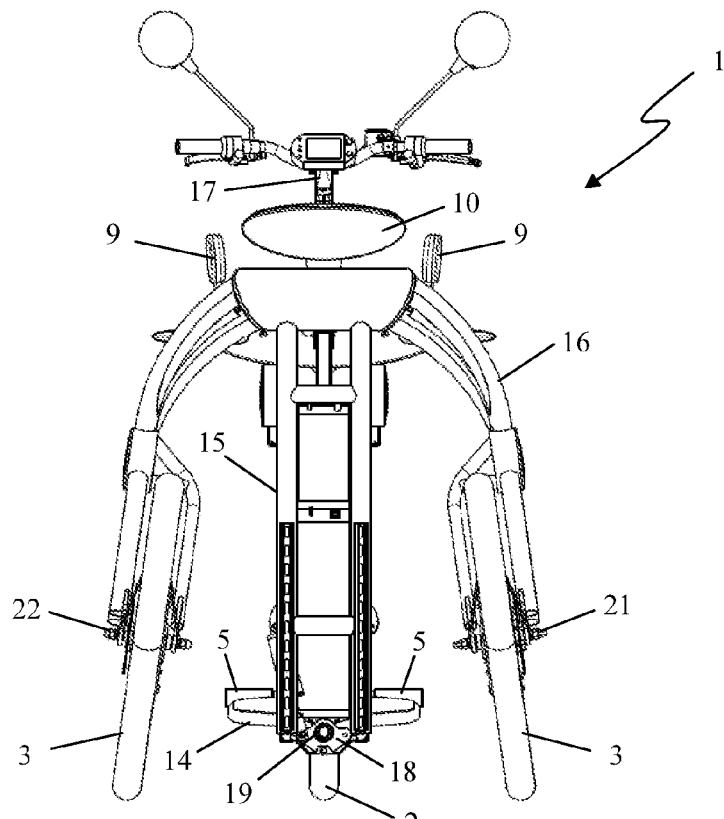
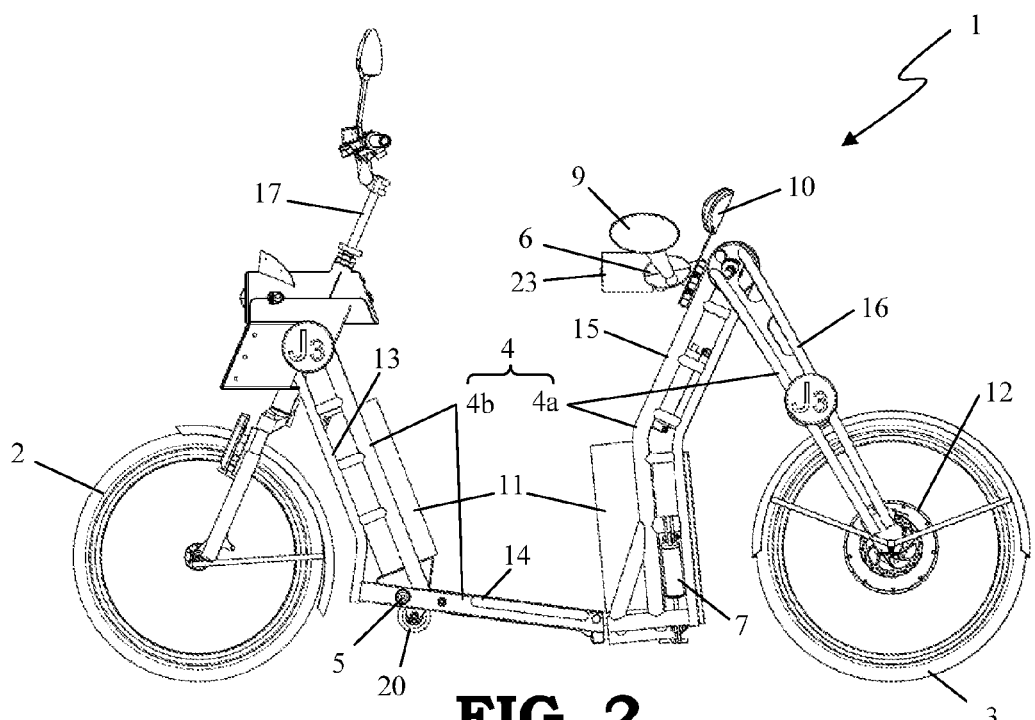

TRICYCLE

This application claims the benefit of Belgian patent application No. BE2013/0158, filed Mar. 11, 2013, which is hereby incorporated by reference in its entirety.

FIELD OF THE INVENTION

The present invention relates to a tricycle for carrying a person, comprising:
- a front wheel arranged substantially in the longitudinal axis of the tricycle;
- two rear wheels arranged laterally on opposite sides with respect to the longitudinal axis of the tricycle;
- a frame, connecting the wheels, comprising a pivoting section that can pivot laterally about a tilting axis positioned substantially in the longitudinal direction of the tricycle;
- a footrest which is part of or is mounted on the frame;
- a second user support which is part of or is mounted on the frame.

The tricycle according to the present invention is more particularly a tricycle powered either by pushing off the ground with the foot, or by a motor.

The longitudinal axis of the tricycle is the axis of the conventional direction of movement of the tricycle. The longitudinal direction of the tricycle is the direction in the conventional direction of movement of the tricycle.

The tricycle comprises a front wheel and two rear wheels to ensure better stability.

BACKGROUND

The prior art of vehicles having a frame, comprising a pivoting section, provides that the vehicle can adapt itself when taking curves, such that the axis of the vehicle moves transversely relative to the direction of movement to facilitate taking curves. On these vehicles, the seat is mounted on the pivoting section to adjust the inclination of this part. Document WO 2005/077683 A1 specifically describes an improved tricycle of this type wherein the seat is mounted on the pivoting section with means for detecting a lateral force that a user applies on the seat. These detecting means are in functional relation with the tilting means of the pivoting section. The tilting means actively controls the inclination of the pivoting section according to said measured force.

Such a control system that uses a seat is not ergonomically ideal.

SUMMARY

The aim of the invention is therefore to provide an alternative to the tricycle comprising a frame provided with a pivoting section that ensures optimal ergonomics for the driver.

This objective can be achieved by producing a tricycle for carrying a person, comprising:
- a front wheel, arranged substantially in the longitudinal axis of the tricycle;
- two rear wheels, arranged laterally on opposite sides with respect to the longitudinal axis of the tricycle;
- a frame, connecting the wheels, comprising a pivoting section that can pivot laterally about a tilting axis located substantially in the longitudinal direction of the tricycle;
- a footrest which is part of or is mounted on the frame;
- a second user support which is part of or is mounted on the frame;

wherein the frame comprises a substantially stationary section relative to the support plane of the three wheels, the pivoting section of the frame being able to pivot relative to the substantially stationary section being located at the front of the tricycle, joining the front wheel and being provided with the footrest of the tricycle, and the substantially stationary section of the frame being located at the rear of the tricycle, joining the rear wheels and being provided with the second support of the tricycle which is designed as an ischiatic support.

According to the invention, the seat of the tricycle in sitting position is replaced by a ischiatic support that provides optimal ergonomics for the driver. This ischiatic support is additionally located on the substantially stationary section of the frame and not on the pivoting section of the frame. The inclination of the pivoting section can therefore be directly adjusted with the feet of the user and not by using the seat which is mounted on the substantially stationary section. Such an adjustment is much more ergonomic. In addition, an adjustment made using the feet facilitates driving and is more ergonomic. The system acts directly, without intermediary, and ensures greater reaction speed. With such a configuration, the tricycle according to the invention is more manoeuvrable than tricycles of the prior art.

The tricycle of the invention is even more easily manoeuvrable in an embodiment wherein the tilting axis is located in a plane comprising the longitudinal axis of the tricycle and substantially perpendicular to the support plane of the three wheels, this axis being inclined 1° to 10° with respect to the support plane of the three wheels, the inclination tending to vary when the tricycle is loaded.

The tilting axis is preferably substantially inclined 5° to 8° and, more preferably, is substantially inclined 6° with respect to the support plane of the three wheels.

The maximum inclination of the pivoting section about its tilting axis is preferably substantially 15°.

According to a preferred embodiment, the tricycle comprises means for centring the pivoting section, so as to return the pivoting section of the frame to its initial position. More specifically, these centring means may comprise cylinders. The pressure of such cylinders is preferably adjustable so that they can be adjusted, for example, relative to the weight or the preferred sensation of the user.

Preferably, the footrest of a tricycle according to the invention is arranged in such a way that it ensures that the feet of the user are inclined relative to the support plane of the three wheels. The position of a user with such an inclination provides the user an ideal ergonomic posture, such that the user can stand upright for a much longer duration.

According to an even more preferred embodiment, the footrest is in the form of one or more bar(s) for placing one's feet. The use of footrest bars provides the system an ideal ergonomic tilt. The footrest bars are preferably round bars.

In a preferred embodiment, the ischiatic support can pivot relative to the frame about a tilting axis which is substantially located in a plane comprising the longitudinal axis of the tricycle and which is substantially inclined 45° to 90° relative to the support plane of the three wheels. Preferably, the tilting axis is, in this case, substantially inclined from 65° to 70°.

The maximum inclination of the ischiatic support about its tilting axis is preferably substantially 15°.

According to a preferred embodiment of a tricycle according to the invention comprising such a pivoting ischiatic support, the tricycle comprises means for centring the ischiatic support so as to return the ischiatic support to its initial position. More specifically, these centring means can comprise a torsion spring.

According to a particular variant of embodiment, the ischiatic support is mounted to the frame in an adjustable heightwise manner, so that the height can be adjusted according to the morphology of the user.

According to a particular embodiment of the invention, the tricycle comprises lateral supports which are mounted substantially on either side of the ischiatic support and at least partially above the ischiatic support so as to support the user laterally. Preferably, such lateral supports are laterally adjustable relative to the ischiatic support, which allows the width of the buttock support to be adjusted. Furthermore, such lateral supports can preferably pivot, relative to the ischiatic support, about a tilting axis substantially perpendicular to the longitudinal axis of the tricycle and substantially parallel to the support plane of the three wheels, so that they can be lowered in such a way that the user can get on or off the tricycle more easily.

BRIEF DESCRIPTION OF THE DRAWINGS

The present invention will now be explained in greater depth based on the following description of several preferred tricycles according to the invention. The purpose of this description is exclusively to give an illustrative example of the invention and to indicate further advantages and details of these tricycles according to the invention, and may thus in no way be interpreted as a limitation of the scope of application of the invention or of the patent rights requested in the claims.

This detailed description will use reference numerals to refer to the appended drawings, wherein:

FIG. 1 is a rear view of an embodiment of a tricycle according to the invention;

FIG. 2 is a side view of the tricycle that is shown in FIG. 1;

DETAILED DESCRIPTION OF EMBODIMENTS

Figure 3:
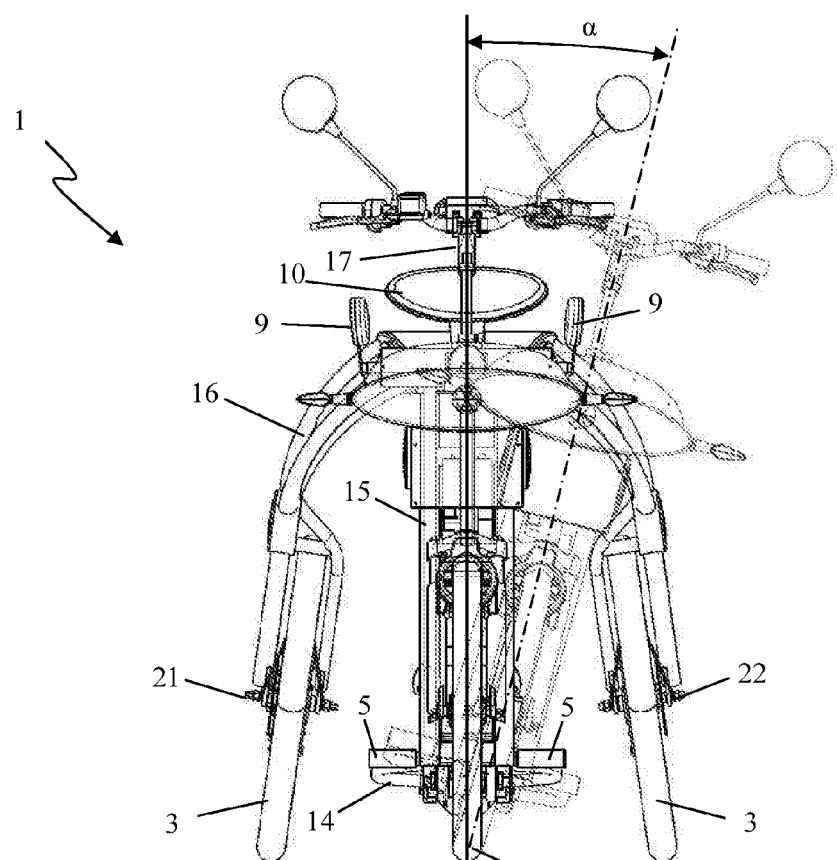
FIG. 3 is a front view of the tricycle shown in FIG. 1, which shows the two positions of the tricycle between pivoting section of the tricycle pivots 15°.
Figure 4:
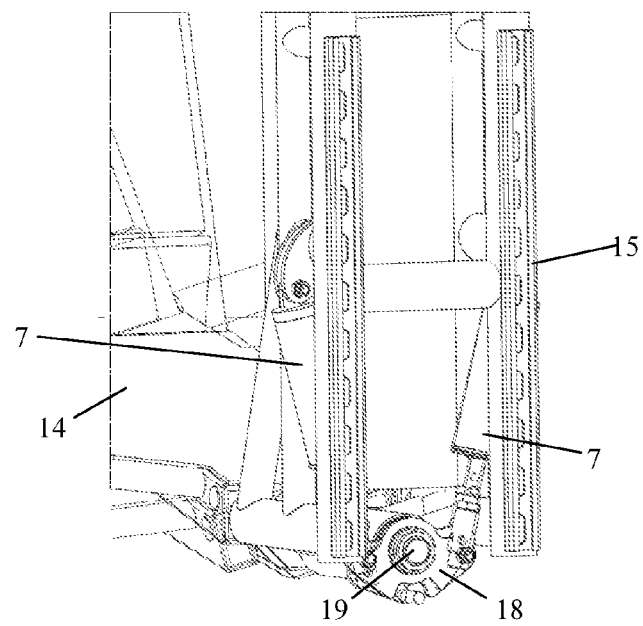
FIG. 4 is a perspective view from behind of a part of the tricycle shown in FIG. 1, at the connection between the substantially stationary section and the pivoting section of the frame of the tricycle, which shows two positions between which the pivoting section of the tricycle pivots 15°.
Figure 5:
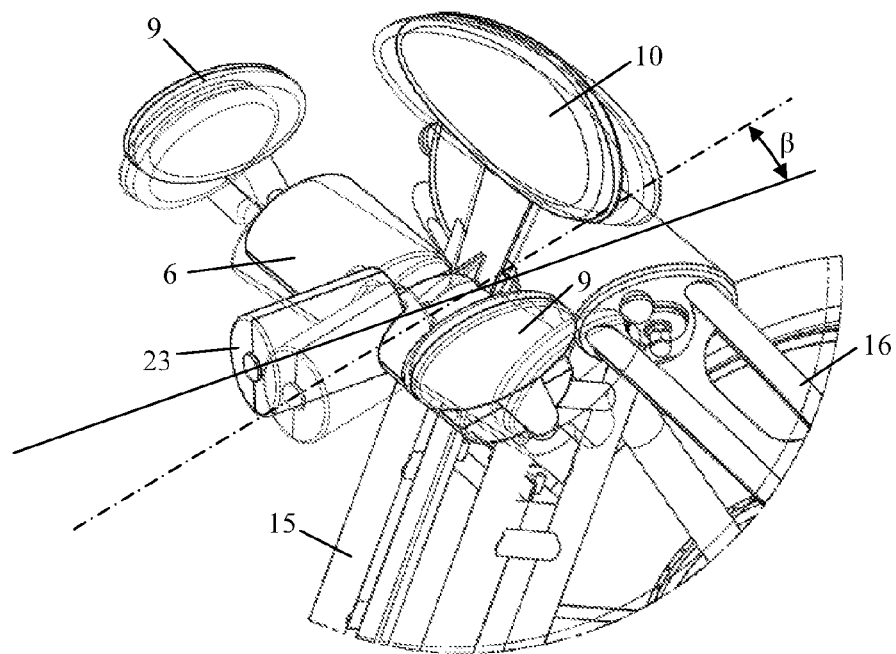
FIG. 5 is a front perspective view of part of the tricycle shown in FIG. 1, at the ischiatic support, showing the two positions between which the ischiatic support pivots 15°.

The Figures show a tricycle (1) comprising a front wheel (2) and two rear wheels (3), as shown in FIGS. 1 to 3 and 7. The front wheel (2) is arranged substantially in the longitudinal axis of the tricycle (1). The two rear wheels (3) are arranged laterally on opposite sides relative to the longitudinal axis of the tricycle (1), such that the tricycle (1) is substantially symmetrical to the longitudinal axis of the tricycle (1).

A frame (4) (see FIG. 2) connects the wheels (2, 3). This frame (4) comprises a front section (4b) and a rear section (4a). The front section (4b) of the frame (4) comprises a platform (14) and a post (13) and seal the front wheel (2) with a handlebar (17) that can pivot relative to the post (13) in a well-known manner. The inclination of the handlebar (17) relative to the post (13) is limited and is in the order of 40°. The handlebar (17) is connected to a first end of the post (13). The other end of the post (13) is connected to a first end of the platform (14). The platform (14) allows the driver to place one foot on it and propel the tricycle (1) by pushing off the ground with the other foot. The platform (14) is, for example, of perforated anti-slip sheeting for better adhesion of the feet. In front of the platform (14) at the two lateral faces, a cylindrical bar (5) is mounted as a footrest (5) to provide support when the tricycle is powered by the motors (12). Owing to the footrests (5) made in the form of cylindrical bars, the inclination of the feet automatically adapts to the best ergonomic position. A roller (20) is mounted below the platform (14) and allows an obstacle to be easily crossed whose height is greater than or equal to the clearance height of the platform (14). The platform (14) is slightly inclined relative to the support plane of the three wheels (2, 3); this angle being between 5° and 15°, thereby allowing better support of the feet. The second end of the platform (14) is connected to the rear section (4a) of the tricycle (1). The rear section (4a) comprises an arcade (15) and an arch (16) supporting the rear wheels (3). A first end of the arcade (15) is connected to the second end of the platform (14), and the second end of the arcade (15) is connected in the middle of the arch (16). On the gantry (15) is mounted an ischiatic support (6) with its lateral supports (9), its lumbar backrest (10) and the retractable seat support (23). The section of the arcade (15), where the ischiatic support (6) is mounted, is substantially inclined 66.5° with respect to the support plane of the three wheels (2, 3), this inclination being such that the user can position himself/herself with the feet on the footrests (5) and the back against the ischiatic support (9), assuming an ideal ergonomic posture. The arch (16) supporting the rear wheels (16) comprises two arms extending laterally from the middle of the arch (16) to the rear wheels (3). The rear wheels (3) have an independent axis of rotation (21, 22) which frees up the space between the wheels (3) required for the user to propel himself/herself by muscular effort.

Figure 7:
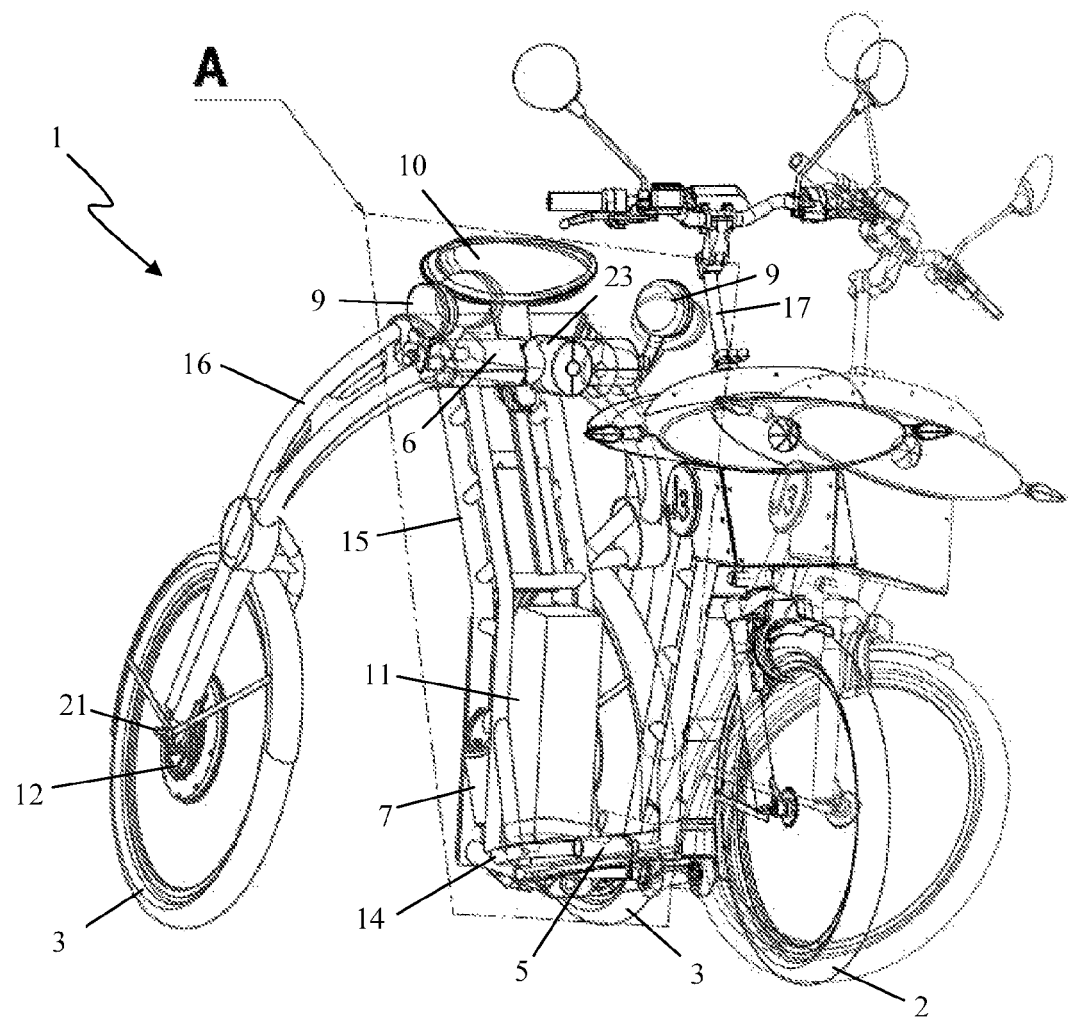
FIG. 7 is a perspective view from the front of the tricycle shown in FIG. 1, which shows two positions of the tricycle between which the pivoting section of the tricycle pivots 15° and the handlebar pivots.
Figure 8:
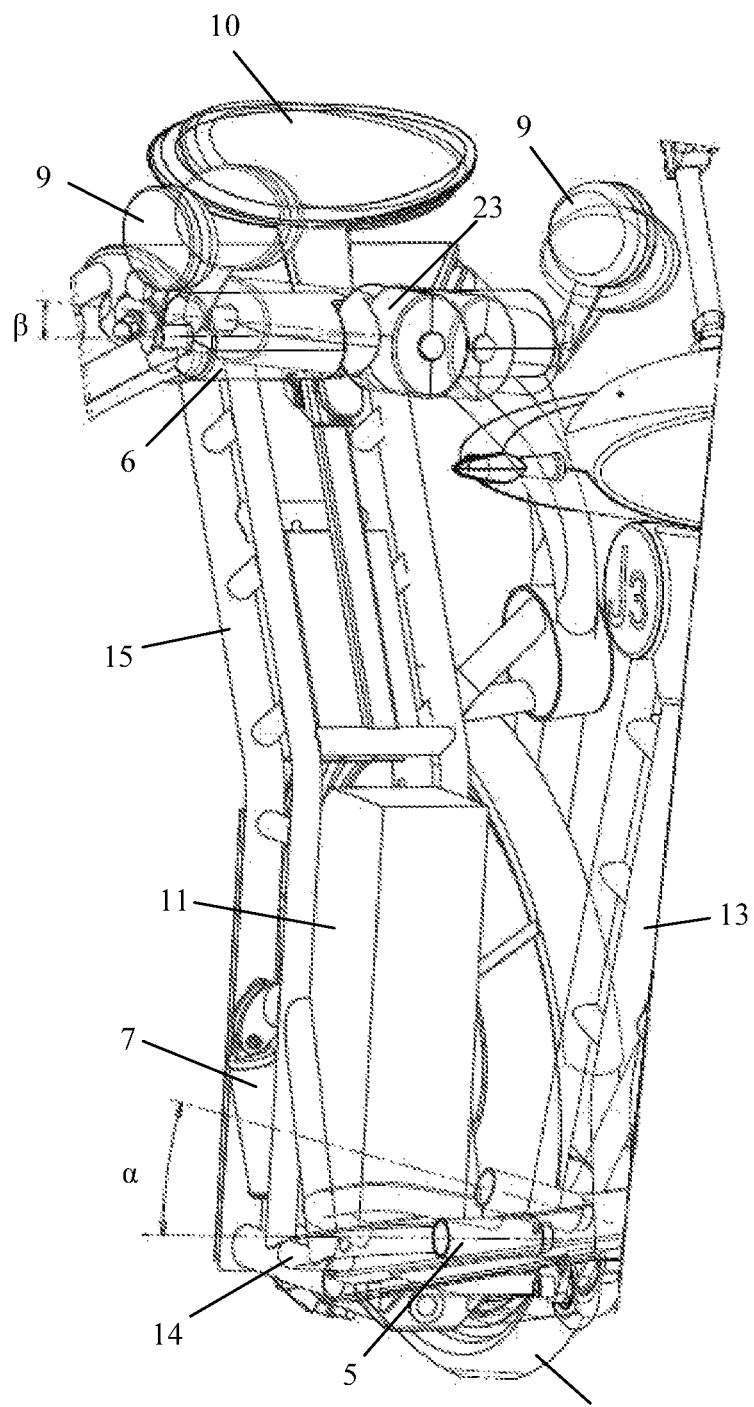
FIG. 8 is a detailed view of zone A of FIG. 7.

The front section (4b) is connected to the rear section (4a) via a pivot which ensures the lateral inclination of the front section (4b). The rear section (4a) is substantially stationary relative to the support plane of the three wheels (2, 3). Thus, when the front section (4b) is inclined relative to the rear section (4b), the rear section (4a) and rear wheels (3) remain immobile as a result of this rotation, and the front section (4b) and the front wheel (2) pivot relative to the support plane of the three wheels (2), as illustrated in FIG. 3 and FIG. 7. The tilting axis (19) of the front portion (4b) is situated in a plane comprising the longitudinal axis of the tricycle (1) and essentially perpendicular to the support plane of the three wheels (2, 3). This axis (19) is substantially inclined 6° relative to the support plane of the three wheels (2, 3), the inclination tending to vary when the tricycle (1) is loaded. FIGS. 3, 7 and 8 show the maximum inclination (α) of the pivoting part (4b) which is substantially 15°. The front section (4b) and the rear section (4a) are connected by with a force transfer plate (18) which is fixedly mounted on the shaft (19) of the front section (4b), as shown in FIG. 1. On each side of the force transfer plate (18), a cylinder (7) is provided that is fixed to the arcade (15) on the rear section (4a). Through these elements, the front section (4b) is able to pivot relative to the rear section. The cylinders (7) are used as means for centring the front section (4b) so as to automatically recentre the front section (4b) in its initial position. The cylinders (7) are adjustable so that the recentring pressure can be adjusted relative to the weight of the user or depending on user preference.

Such a configuration allows the user to adjust the pivoting section using his/her feet.

Figure 9:
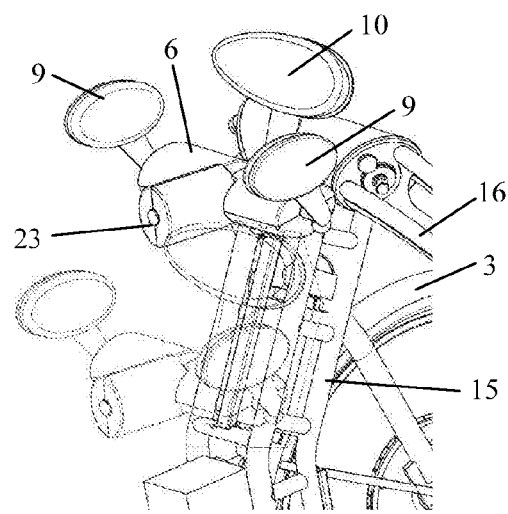
FIG. 9 is a perspective view from the front of a section of the tricycle shown in FIG. 1, at the ischiatic support, which shows two positions of the ischiatic support between which the ischiatic support is moved upward.

The ischiatic support (6) of the tricycle (1) is adjustable in height on the arcade (15), as illustrated in FIG. 9, so that the height can be adjusted according to the morphology of the user. Numerous means of attachment that allow such movement already exist and are known in the prior art.

The ischiatic support (6) is further pivotally mounted laterally relative to the arcade (15) about an axis substantially inclined 66.5° relative to the support plane of the three wheels (2, 3). The inclination of the axis about which the support can rotate is the same as that of the arcade (15), as illustrated in FIGS. 5 to 8. This allows the user to monitor the movement of the tricycle (1) via the ischiatic support (6). The maximum inclination (β) of the ischiatic support (6) about its tilting axis is substantially 15°. Numerous solutions are known in the prior art for making this type of connection.

Figure 6:
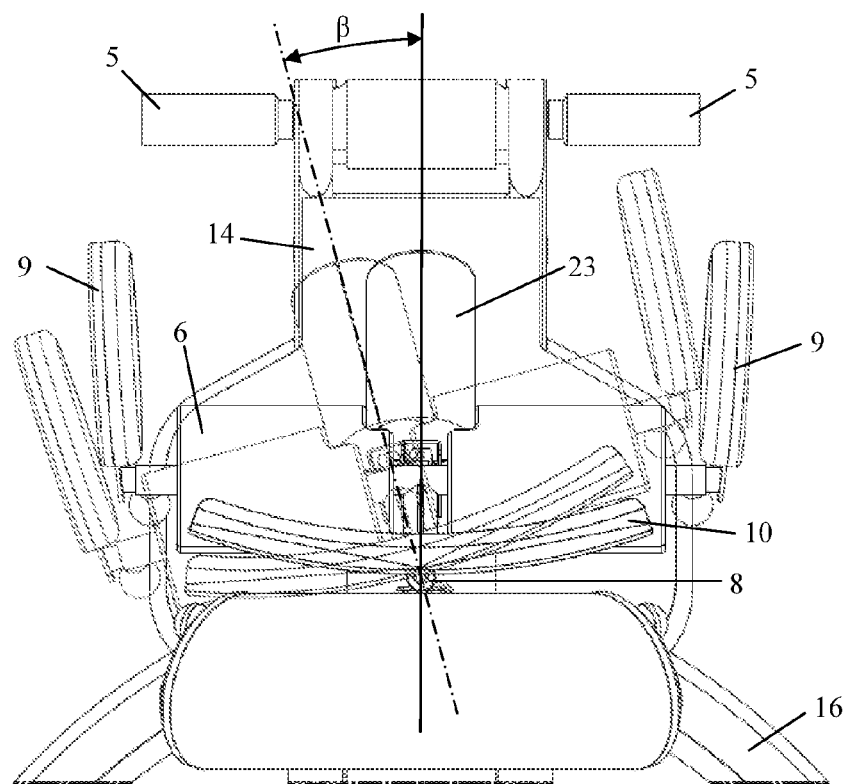
FIG. 6 is a top view of part of the tricycle shown in FIG. 1, at the ischiatic support, which shows two positions of the ischiatic support between which the ischiatic support pivots 15°.

Two springs (8), as shown in FIG. 6, acting in opposite directions, constitute means for centring the ischiatic support (6) to ensure that the ischiatic support (6) returns to its initial position.

A lumbar backrest (10), provided to support the lower back of the user, is mounted above and in connection with the ischiatic support (6), such that the backrest (10) follows all the movements of the ischiatic support (6) (see FIGS. 5 to 8).

Two lateral supports (9) support the movements user laterally at the pelvis and are substantially mounted on either side of the ischiatic support (6), and in connection with the ischiatic support (6), such that they follow all the movements of the ischiatic support (see FIGS. 5 to 8).

Figure 10:
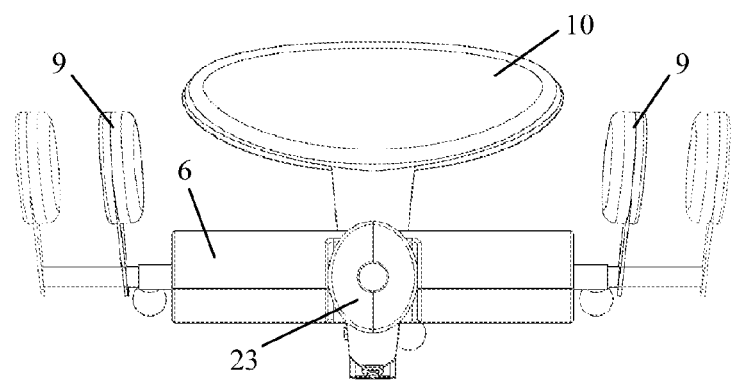
FIG. 10 is a front view of the ischiatic support, with the lumbar backrest, the lateral supports and the seat support, which shows two positions of the lateral supports between which the distance between the lateral supports is set.
Figure 11:
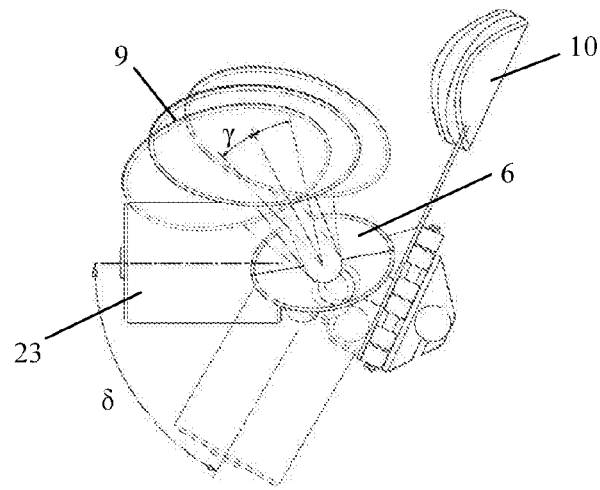
FIG. 11 is a side view of the ischiatic support, with the lumbar backrest, the lateral supports and the seat support, which shows three positions of the lateral supports between which the inclination of the lateral supports relative to the ischiatic support is changed, and which shows two positions of the seat support between which the seat support is retracted.

The lateral supports (9) for the pelvis are adjustable in width relative to the ischiatic support (6), as illustrated in FIG. 10, so that the distance between the supports (9) can be adjusted relative to the width of the user's pelvis. The lateral supports (9) can pivot relative to the ischiatic support (6) about a tilting axis that is substantially perpendicular to the longitudinal axis of the tricycle (1) and substantially parallel to the support plane of the three wheels (2, 3), so that it can be lowered in such a way that the user can get on and off the tricycle more easily. In FIG. 11, three positions of the lateral supports (9) are shown, with a inclination (γ) of 15° between the various positions. Many systems for adjusting the lateral supports (9) are possible.

The tricycle (1) as illustrated further comprises a seat support (23). As a seat support (23) gives riders the opportunity to opt for a support between the legs without necessarily having to use the lateral supports (9). This seat support (23) is retractable, so that it can be lowered (δ) 60°, as illustrated in FIG. 11.

The tricycle (1) as shown is powered either by pushing off on the ground with the foot, or by motors (12). The motors (12) are mounted in the axis of the rear wheels, as shown in FIG. 2, so as not to impede the movements of the user. The batteries (11) for the motors (12) are mounted either inside the post (13) of the front frame (4), or at the base of the arcade (15) of the rear frame (4). It is also possible to equip the tricycle with a motor that is mounted on or in the frame (4), or in a single wheel (2, 3), or to mount a motor in or on each wheel (2, 3). It is also possible to mount the batteries (11) only on the post (13), or only on the arcade (15). Numerous positions are possible without the motor preventing this tricycle (1) from being propelled with the feet.

The invention claimed is:

1. A tricycle to carry a person, comprising:
 a front wheel arranged substantially in the longitudinal axis of the tricycle;
 two rear wheels, arranged laterally on opposite sides with respect to the longitudinal axis of the tricycle;
 a frame, connecting the wheels, comprising a pivoting section that pivots laterally about a tilting axis positioned substantially in a longitudinal direction of the tricycle;
 a footrest which is part of or is mounted on the frame;
 a second user support which is part of or is mounted on the frame;
 wherein the frame comprises a section substantially stationary relative to a support plane of the three wheels, in that the pivoting section of the frame pivots relative to the substantially stationary section, is located at a front of the tricycle, joining the front wheel, and is provided with the footrest of the tricycle, and in that the substantially stationary section of the frame is located at the—area of the tricycle, joining the rear wheels, and is provided with the second user support of the tricycle which is designed as an ischiatic support, where the ischiatic support pivots relative to the frame about a tilting axis which is substantially located in a plane comprising the longitudinal axis of the tricycle and which is substantially inclined 60° to 90° relative to the support plane of the three wheels.

2. The tricycle according to claim 1, characterised in that the tilting axis is located in a plane comprising the longitudinal axis of the tricycle and substantially perpendicular to the support plane of the three wheels, this axis being inclined 1° to 10° with respect to the support plane of the three wheels, the inclination tending to vary when the tricycle is loaded.

3. The tricycle according to claim 2, characterised in that the tilting axis is substantially inclined 6° with respect to the support plane of the three wheels.

4. The tricycle according to claim 1, characterised in that the maximum inclination (a) of the pivoting section around its tilting axis is substantially 15°.

5. The tricycle according to claim 1, characterised in that the tricycle comprises means for centering the pivoting section so as to return the pivoting section of the frame to its initial position.

6. The tricycle according to claim 5, characterised in that the means for centering the pivoting section comprise cylinders.

7. The tricycle according to claim 6, characterised in that the pressure of the cylinders is adjustable.

8. The tricycle according to claim 1, characterised in that the footrest is arranged in such a way that it ensures that the feet of the user are inclined relative to the support plane of the three wheels.

9. The tricycle according to claim 8, characterised in that the footrest is built in the form of one or more bar(s) for placing one's feet, wherein the one or more bar(s) are positioned between the front wheel and the two rear wheels.

10. The tricycle according to claim 1, characterised in that the maximum inclination ($\beta$) of the ischiatic support about its tilting axis is substantially 15°.

11. The tricycle according to claim 1, characterised in that the tricycle comprises means for centering the ischiatic support so as to return the ischiatic support to its initial position.

12. The tricycle according to claim 11, characterised in that the means for centering the ischiatic support comprise a torsion spring.

13. The tricycle according to claim 1, characterised in that the ischiatic support is mounted to the frame in an adjustable heightwise manner.

14. The tricycle according to claim 1, characterised in that the tricycle comprises lateral supports which are mounted substantially on either side of the ischiatic support and at least partially above the ischiatic support so as to support the user laterally.

15. The tricycle according to claim 14, characterised in that the lateral supports are adjustable laterally relative to the ischiatic support.

16. The tricycle according to claim 14, characterised in that the lateral supports can pivot relative to the ischiatic support about a tilting axis substantially perpendicular to the longitudinal axis of the tricycle and substantially parallel to the support plane of the three wheels.

17. The tricycle of claim 1, wherein the footrest includes a first end and a second end, the first end positioned adjacent to the two rear wheels and the send end positioned adjacent to the front wheel, wherein the footrest is inclined from the first end of the footrest to the second end of the footrest.

* * * * *